United States Patent [19]

Schlager

[11] Patent Number: 5,572,096
[45] Date of Patent: Nov. 5, 1996

[54] METHOD AND CIRCUIT FOR CLAMPING THE RECIRCULATION CURRENT IN STATOR WINDINGS

[75] Inventor: Karl M. Schlager, Campbell, Calif.

[73] Assignee: SGS–Thomson Microelectronics, Inc., Carrollton, Tex.

[21] Appl. No.: 250,027

[22] Filed: May 27, 1994

[51] Int. Cl.⁶ ...................................................... H02P 7/00
[52] U.S. Cl. .......................... 318/254; 318/138; 318/439
[58] Field of Search ..................................... 318/138, 254, 318/439, 700–838; 363/89–98

[56] References Cited

U.S. PATENT DOCUMENTS

| | | | |
|---|---|---|---|
| 3,697,837 | 10/1972 | Umbaugh | 318/128 |
| 3,743,908 | 7/1973 | Betke | 318/138 |
| 3,834,345 | 9/1974 | Hager et al. | 318/138 |
| 3,924,170 | 12/1975 | Foster | 318/561 |
| 4,167,693 | 9/1979 | Liska et al. | 318/138 |
| 4,491,770 | 1/1985 | Gotou | 318/254 |
| 4,558,264 | 12/1985 | Weischedel | 318/254 |
| 4,626,750 | 12/1986 | Post | 318/139 |
| 4,641,066 | 2/1987 | Nagata et al. | 318/254 |
| 4,712,050 | 12/1987 | Nagasawa et al. | 318/254 |
| 5,032,780 | 7/1991 | Hopkins | 318/696 |
| 5,140,232 | 8/1992 | Naito | 318/138 |
| 5,172,036 | 12/1992 | Cameron | 318/138 |
| 5,173,645 | 12/1992 | Naito | 318/138 |
| 5,191,269 | 3/1993 | Carobolante | 318/254 |
| 5,196,771 | 3/1993 | Naito | 318/254 |
| 5,204,594 | 3/1993 | Carobolante | 318/254 |
| 5,221,881 | 6/1993 | Cameron | 318/254 |
| 5,264,772 | 11/1993 | Bahn | 318/701 |
| 5,287,044 | 2/1994 | Izawa et al. | 318/254 |
| 5,309,078 | 5/1994 | Cameron | 318/811 |
| 5,319,291 | 6/1994 | Ramirez | 318/254 |
| 5,373,435 | 12/1994 | Jayaraman et al. | 363/98 |
| 5,397,967 | 3/1995 | Carobolante et al. | 318/254 |

FOREIGN PATENT DOCUMENTS

| | | |
|---|---|---|
| 0 527 641 | 2/1993 | European Pat. Off. . |
| 40 38 199 | 6/1992 | Germany . |
| 41 42 274 | 6/1993 | Germany . |

OTHER PUBLICATIONS

*Power Mosfets–Theory and Applications*, Duncan A. Grant, et al., Feb., 1989, John Wiley & Sons, Inc., pp. 257–281.

Primary Examiner—Paul Ip
Attorney, Agent, or Firm—Joseph C. Arrambide; Theodore E. Galanthay; Lisa K. Jorgenson

[57] ABSTRACT

A circuit for clamping the voltage spike of a stator coil winding of a brushless direct current motor is disclosed. The circuit uses a comparator to monitor the voltage on a stator winding. When a voltage spike is detected, the comparator turns on the stator winding driver transistor to clamp the voltage spike. The comparator can be designed to trigger at a desired threshold voltage so that the threshold can optimized. Additionally, the comparator can be selectively disabled to trigger when voltage spikes are anticipated.

20 Claims, 2 Drawing Sheets 5,572,096

METHOD AND CIRCUIT FOR CLAMPING THE RECIRCULATION CURRENT IN STATOR WINDINGS

BACKGROUND OF THE INVENTION

1. FIELD OF THE INVENTION

This invention relates to electronic circuits for controlling the power to brushless direct current motors, and more particularly to actively clamping current spikes in the stator windings of a brushless direct current motor when the stator coils are commutated.

2. DESCRIPTION OF THE RELEVANT ART

The present invention pertains to polyphase direct current (dc) motors, in general, and particularly to three phase dc motors which may be of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

FIG. 1 illustrates the typical architecture of a brushless polyphase direct current motor as described in detail in U.S. Pat. Nos. 5,172,036 and 5,204,594 which are fully incorporated into this specification by reference. Specifically, FIG. 1 shows that the motor 12 consists of a stator 16 and a rotor 14. The appropriate phase of the motor is determined by Hall effect sensors 103 or by monitoring the back electromotive force (BEMF) on the floating coil. Thus, the commutator circuit 20 determines the appropriate driver circuit 10 to enable. FIG. 2 shows a general typical schematic of a driver circuit. The method and apparatus for operating a polyphase motor direct current motor is more fully explained in U.S. Pat. No. 5,221,881 and is fully incorporated into this specification by reference.

Motors of this type can typically be thought of as having a stator with three coils connected in a "Y" configuration, although actually, a larger number of stator coils are usually employed with multiple motor poles. FIG. 1 shows a stator in a "Y". configuration as element 16. Typically, in such applications, eight pole motors are used having twelve stator windings and four N-S magnetic sets on the rotor resulting in four electrical cycles per revolution of the rotor. In bipolar operation, the coils are energized in a sequences such that a current path is established through two coils of the "Y" with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. Therefore, six commutation sequences are defined for each electrical cycle in a three phase motor as given below in

TABLE A

| PHASE | CURRENT FLOWS FROM: | TO: | FLOATING COIL: |
| --- | --- | --- | --- |
| 1 | A | B | C |
| 2 | A | C | B |
| 3 | B | C | A |
| 4 | B | A | C |

TABLE A-continued

| PHASE | CURRENT FLOWS FROM: | TO: | FLOATING COIL: |
| --- | --- | --- | --- |
| 5 | C | A | B |
| 6 | C | B | A |

Another common mode of operation is the unipolar mode where one stator coil winding is energized at a time. This is accomplished by either grounding the center tap of the stator windings while sequentially energizing each stator winding, or by tying the center tap to the voltage supply and sequentially grounding the other end of each stator winding. In unipolar operation, it may be desirable to allow the voltage on the high side drivers to go several volts above Vcc to detect zero crossings, or determine rotor position, or the like.

In the either unipolar or bipolar operation of the motor, large voltage spikes are generated when the phases are commutated since the operation requires that the motor current be redirected from one stator winding to another. For example, referring now to FIG. 2, in phase 1 of Table A above, transistor 44 and transistor 45' of FIG. 2 are on which allows current to flow from the voltage source through transistor 44, stator winding 32, stator winding 33, and transistor 45'. During commutation from phase 1 to phase 2, transistor 45' is turned off while transistor 45" is turned on. This causes a voltage spike in the stator winding 33 due to the collapsing electromagnetic field which was created by the current flowing in stator winding 33. The voltage spike on the stator winding is a function of the rate (di/dt) at which the stator winding current is turned off and can be described as dV=–. L(di/dt) where dV is the differential voltage, L is the inductance of the stator winding, and (di/dt) is the rate at which current is changing as a function of time. Therefore, the quicker the current is turned off and the larger the inductance of the stator coil, the larger the voltage spike.

In the past, this voltage spike was clamped using a diode such as the diodes 47, 47', 47" and 48, 48', 48" in FIG. 2. To illustrate how the diodes work in the circuit, assume again that the circuit is in phase 1 and will commutate to phase 2 of Table A. While in phase 1, current flows through transistor 44, stator winding 32, stator coil 33, transistor 45', and through sense resistor 49 to ground. Commutation occurs by turning 45' off while turning 45" on, the result of which is to redirect the current from stator winding 33 to stator winding 34. Since the current in stator winding 33 has gone from some significant value to zero in a relatively short amount of time, an inductive voltage spike is generated. Therefore, the voltage potential at node "out b" is driven above the source voltage by the voltage spike. As the voltage potential at node "out b" rises above the turn-on threshold of the diode, diode 47' turns on and clamps the voltage spike to the voltage source. The turn-on voltage of a diodes is typically around 700 millivolts. Diodes 47 and 47" serve the same functions for stator windings a and c, respectively. Similarly, diodes 48, 48', and 48" clamp the voltage spikes which are created when stator windings 32, 33, and 34 are turned off after being turned on by transistors 44, 44', and 44", respectively.

This circuit can be further simplified by showing just the basic elements for the control of the current through stator winding 32 in FIG. 3. FIG. 3 shows stator coil 32 connected to the center tap of the stator coils on one end and the node "out a" at the other end. Node "out a" can be driven to the high voltage by turning on transistor 44. Conversely, node "out a" can be driven to ground by turning on transistor 45. Additionally, "node a" is floating when both transistor 44

3 and 45 are turned off. During commutation, either the resulting voltage spike is clamped by diode 47 when the voltage spike is above Vcc or the voltage spike is clamped by diode 48 when the resulting voltage spike is below ground.

These clamping diodes 47 and 48 have typically been either external or internal diodes. External diodes are undesirable since they require space on printed circuit boards. Internal diodes in integrated circuits are undesirable since they tend to be parasitic devices that turn on and latch circuits in an undesirable way.

SUMMARY OF THE INVENTION

In light of the above, therefore, it is an object of the invention to eliminate the need for external diodes for clamping voltage spikes generated by commutating stator coils.

It is another object of the invention to eliminate the need for internal diodes which tend to be parasitic devices that turn on and latch circuits in an undesirable way.

It is another object of the invention to actively clamp the voltage spike with the driver transistor at a designed voltage threshold.

It is another object of the invention to actively clamp the voltage spikes with the driver transistors during commutations.

DETAILED DESCRIPTION OF THE EMBODIMENT

Figure 1:
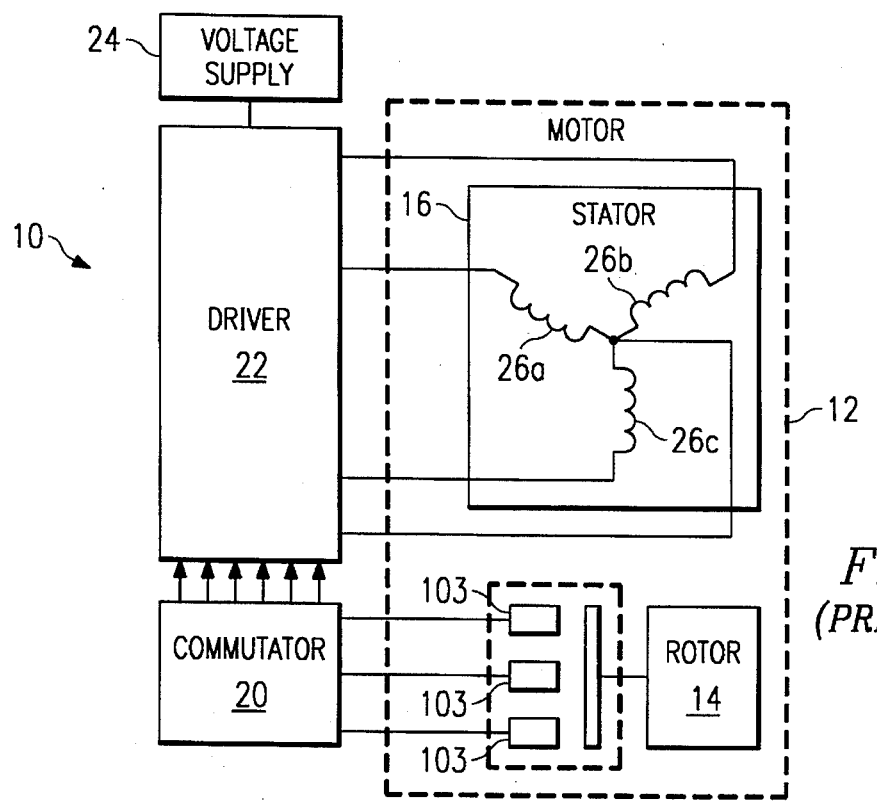
FIG. 1 is a block diagram of a brushless direct current motor.
Figure 2:
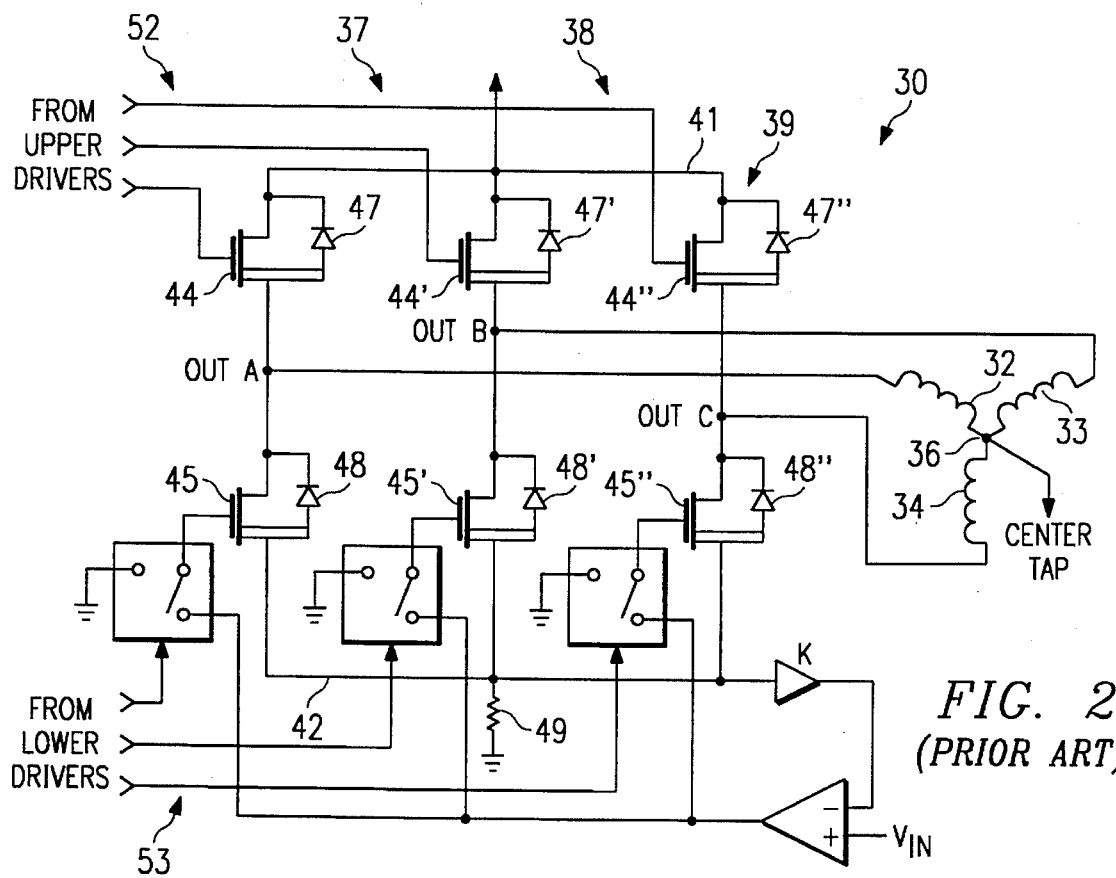
FIG. 2 is a schematic diagram of the current drivers in a typical brushless direct current motor.
Figure 3:
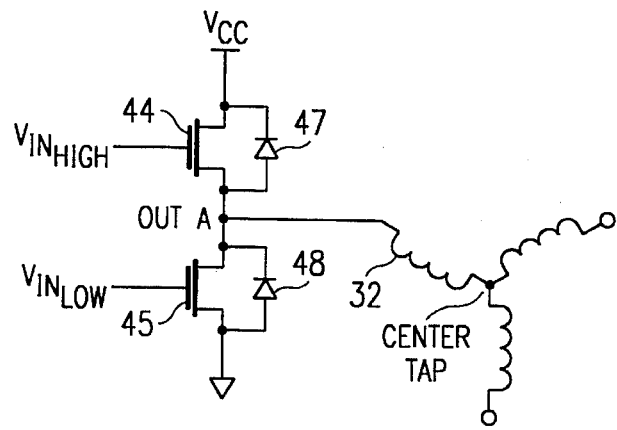
FIG. 3 is a schematic diagram of the current drivers for just one stator winding in a typical brushless direct current motor.
Figure 4:
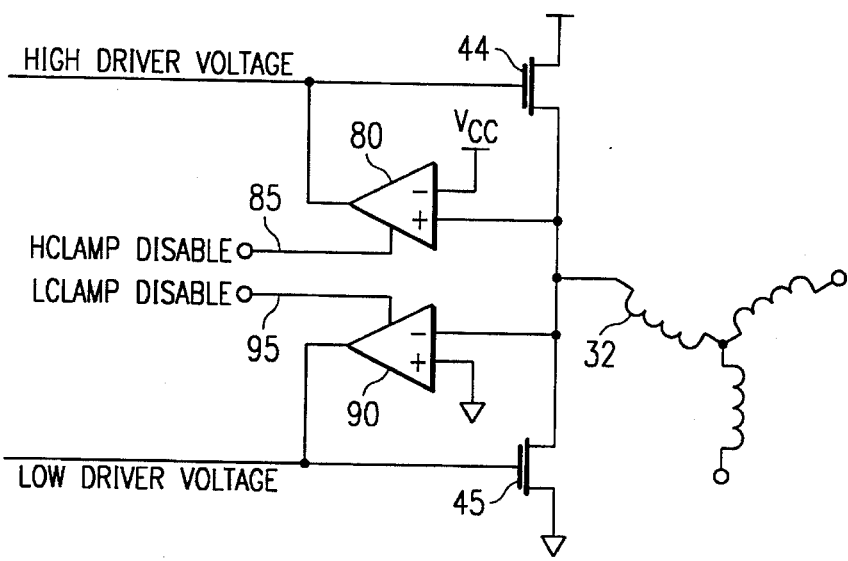
FIG. 4 is a schematic diagram of the current drivers with an embodiment for the voltage clamp in a brushless polyphase direct current motor system.

The present invention satisfies the above objectives of eliminating the need for internal or external diodes by actively clamping the voltage spike by using the circuit in FIG. 4.

In one embodiment of the invention, FIG. 4 shows stator winding 32 connected to power transistor 44, power transistor 45, comparator 80, and comparator 90. Comparator 80 has its inverting input connected to a voltage reference, for example Vcc, and its non-inverting input connected to stator winding 32. Comparator 90 has its inverting input connected to stator winding 32 and its non-inverting input connected to a voltage reference, for example ground. The comparator 80 output is connected to the gate of transistor 44, which is also connected to the high drive voltage control signal. Similarly, the output of comparator 90 is connected to the gate of transistor 45, which is also connected to the low driver voltage control signal.

In operation, stator winding 32 will either be driven to a high voltage, low voltage or left floating, depending on which phase the motor is in. In bipolar operation, for example, Table A suggests that stator winding 32 will be driven to high voltage during phases 1 and 2, driven to low voltage during phases 4 and 5, and left floating during phases 3 and 4. As is known in the art, stator winding 32 is driven to high voltage by supplying transistor 44 with the appropriate high driver voltage signal to turn it on while simultaneously keeping transistor 45 off with the appropriate low driver voltage signal. Conversely, stator winding 32 is driven low by turning on transistor 45 with the low driver voltage signal while turning off transistor 44. Stator winding 32 is left floating by turning off transistors 44 and 45 with their respective driver voltage signals.

In this embodiment of the invention, comparator 80 and comparator 90 are always enabled. Therefore, transistor 44 will be turned on whenever comparator 80 detects a voltage on stator winding 32 that is above its voltage reference, Vcc. Therefore, any voltage spikes on stator winding 32 will be clamped to Vcc through transistor 44. Similarly, transistor 45 will be turned on clamping any low voltage spikes whenever comparator 90 detects a voltage on stator winding 32 that is below its voltage reference, ground.

In another embodiment of the present invention, comparator 80 and 90 are selected or designed to trigger at optimized threshold voltages. An optimized threshold voltage may be a voltage which is high enough to ignore false triggering due to noise on the line and yet be low enough to trigger on all real voltage spikes. A threshold voltage of around 72 millivolts provides good noise immunity while offering significant clamping advantages over a diode which typically clamps at 700 millivolts.

Figure 5:
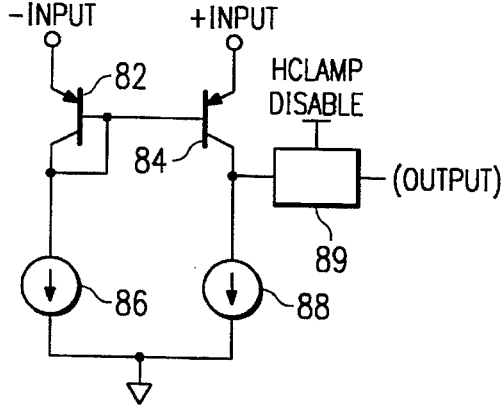
FIG. 5 is a schematic diagram of a typical high side comparator in a brushless polyphase direct current motor system.

A high side comparator design that has a designable threshold is shown in FIG. 5. In this comparator, the inverting input is connected to the emitter of transistor 82 and the non-inverting input is connected to the emitter of transistor 84. The base of transistor 82 is connected to its collector, to current source 86, and to the base of transistor 84. The collector of transistor 84 is connected to the output of the comparator and to current source 88. Current source 86 and 88 sink current to ground from transistor 82 and 84, respectively. In operation, transistor 84 turns on, pulling the output high, when the non-inverting input is greater than the inverting input by at least the threshold voltage, determined by the ratio of the emitter size of transistor 82 to 84. In one embodiment, this ratio is approximately 16, which gives a threshold voltage of approximately 72 millivolts which provides significant noise immunity while being responsive to the recirculation voltage spikes. The threshold voltage can be changed using the equation threshold $=kt/q \ \ln(A1/A2)$ $=0.026 \ \ln(A1/A2)$ where $(A1/A2)$ is the ratio of emitter area on the two transistors. In another embodiment, a threshold voltage in the range of 50 millivolts to 100 millivolts provides significant noise immunity while being responsive to the recirculation voltage spikes.

Figure 6:
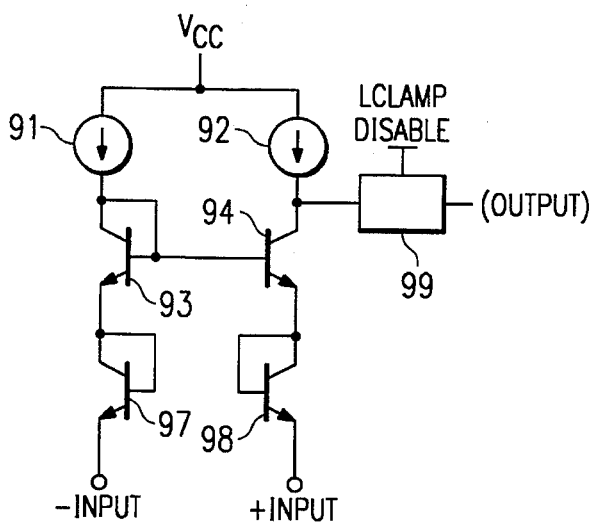
FIG. 6 is a schematic diagram of a typical low side comparator in a brushless polyphase direct current motor system.

FIG. 6 shows an example of a common low side comparator 90 which is similar to the high side comparator in FIG. 5. In the low side comparator, the inverting input is connected to the emitter of transistor 97 and the non-inverting input is connected to transistor 98. The base and collector of transistor 97 are connected to the emitter of transistor 93. Similarly, the base and collector of transistor 98 are connected to the emitter of transistor 94. Transistor 93 has its base connected to its collector, to current source 91, and to the base of transistor 94. Current source 91 and 92 drive current from Vcc to the collector of transistor 93 and 94, respectively. The output of the comparator is connected to the collector of transistor 94 and current source 92. In operation, transistor 93 turns on when the inverting input goes below the non-inverting input by more than the threshold voltage of the comparator. This causes transistor 94 to turn off which allows current source 92 to drive the output of the comparator high. Like the high side comparator, the threshold voltage is determined by the ratio of the emitter area of transistor 93 to 94. In one embodiment, the ratio is approximately 16 which gives a threshold voltage of approximately 72 millivolts which provides significant noise immunity while being responsive to the recirculation voltage spikes. In another embodiment, the threshold voltage is in the range of 50 millivolts to 100 millivolts also provides good noise immunity while being responsive to the recirculation voltage. Transistors 97 and 98 are added in this circuit to provide extra reverse breakdown protection for the bipolar transistors.

Although the high side and low side comparators have been described and illustrated with a certain degree of particularity, it is understood that they have been made only by way of example, and that numerous changes in the combination and arrangement of parts can be resorted to by those skilled in the art without departing from the spirit and scope of the invention.

In another embodiment, comparators 80 and 90 are selectively enabled and disabled using signals Hclampdisable and Lclampdisable, respectively, as shown in FIG. 4. In FIG. 5, Hclampdisable is shown as controlling switch 89 which can be implemented by a person skilled in the art by using a MOSFET, bipolar, or a combination of MOSFET and bipolar transistors. Similarly, FIG. 6 shows Lclampdisable controlling switch 99 which can also be made implemented by a person skilled in the art by using a MOSFET, bipolar, or a combination of MOSFET and bipolar transistors. By selectively enabling and disabling the comparators, a person skilled in the art can mask out periods in the commutation cycle in which stator winding voltage spikes are not expected. Using this technique false triggers due to noise on the winding can be avoided. Additionally, it may be advantageous to allow the stator winding voltage to go above the Vcc during certain modes of operation such as during unipolar operation. This can also be accomplished by selectively disabling the high side comparators so that they do not clamp the voltage during the phases of unipolar operation where it may be advantageous to operate above Vcc.

In another embodiment, comparator 80 and 90 are disabled until the logic control of the motor anticipates that a voltage spike will occur, such as during commutation. Comparator 80 can be disabled using the Hclampdisable signal 85 which originates from the logic control of the motor. Similarly, comparator 90 can be controlled by Lclampdisable signal 95. By disabling the comparators, the risk of a false trigger has been reduced. Additionally, the threshold voltages of the comparators may be reduced since the risk of a false trigger has been reduced.

It should be noted that the circuit of the invention can be integrated on a single integrated circuit. Thus, the present invention provides significant cost and reliability advantages over prior approaches.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The transistors in the drawings can be any transistor commonly used such as bipolar junction transistors or field effect transistors.

We claim:

1. A circuit for clamping voltage spikes on a stator winding of a direct current motor comprising:

a transistor having a current path connected between a voltage supply and the stator coil and having a control terminal;

a driver circuit connected to the control terminal of said transistor, and a comparator for comparing the voltage on the coil to a reference voltage and having an output connected to the control terminal of the transistor;

wherein said comparator turns on said transistor responsive to the voltage on the stator coil exceeding the voltage supply voltage.

2. The circuit of claim 1 wherein the comparator has a control terminal for receiving a disable signal, so that the comparator may be selectively disabled.

3. The circuit of claim 2 further comprising: means connected to the control terminal of the comparator for disabling the comparator until the commutation of a stator winding.

4. The circuit of claim 1 wherein the threshold voltage of said comparator is adjustable.

5. The circuit of claim 4 wherein the threshold voltage is within the range of 50 millivolts to 100 millivolts.

6. The circuit of claim 1 wherein the comparator comprises:

a first PNP transistor having an emitter as the inverted input of the comparator, having a base, and having a collector;

a second PNP transistor having an emitter as a non-inverted input of the comparator, having a base connected to the base and collector of the first PNP transistor, and having a collector;

a first current source having a drain connected to the collector and base of the first transistor and the base of the second transistor, and having a source connected to a voltage reference;

a second current source having a drain connected to the collector of the second transistor and forming the output node of the comparator, and having a source connected to the voltage reference.

7. A circuit for clamping voltage spikes on a stator coil of a direct current motor comprising:

a high side transistor having a current path connected between a voltage supply voltage and the stator coil and having a control terminal;

a high side driver circuit connected to the control terminal of said transistor, and a high side comparator for comparing the voltage on the stator coil to a reference voltage and having an output connected to the control terminal of the transistor so that the transistor turns on responsive to the voltage on the coil exceeding the voltage supply voltage;

a low side transistor having a current path connected between a ground voltage and the stator coil and having a control terminal;

a low side driver circuit connected to the control terminal of said low side transistor, and a low side comparator for comparing the voltage on the stator coil to a reference voltage and having an output connected to the control terminal of the low side transistor so that the transistor turns on responsive to the voltage on the coil dropping below the ground voltage.

8. The circuit of claim 7 wherein the high side comparator and the low side comparator have control terminals for receiving a disable signals, so that the comparators may be individually selectively disabled.

9. The circuit of claim 8 further comprising means connected to the control terminals of the comparators for disabling the comparators until the commutation of a stator winding.

10. The circuit of claim 7 wherein the threshold voltage of the comparators are adjustable.

11. The circuits of claim 10 wherein the threshold voltage for the low side comparator is in the range of 50 millivolts to 100 millivolts and the threshold voltage for the high side comparator is in the range of 50 millivolts to 100 millivolts.

12. The circuit of claim 7 wherein the high side comparator comprises:

a first PNP transistor having an emitter as the inverted input of the comparator, having a base, and having a collector;

a second PNP transistor having an emitter as a non-inverted input of the comparator, having a base connected to the base and collector of the first PNP transistor, and having a collector;

a first current source having a drain connected to the collector and base of the first transistor and the base of the second transistor, and having a source connected to a voltage reference;

a second current source having a drain connected to the collector of the second transistor and forming the output node of the comparator, and having a source connected to the voltage reference.

13. A method for clamping voltage spikes on stator coil windings comprising the steps of:

commutating drive current through a driver circuit to a winding through a transistor;

comparing the voltage on the stator coil winding to a reference voltage for detecting a voltage spike on the coil;

turning on the transistor responsive to the voltage on the coil winding exceeding voltage supply voltage.

14. The method of claim 13 further comprising selectively disabling the comparison when a voltage spikes are not anticipated.

15. The method of claim 13 further comprising: disabling comparing, sensing commutation of coil winding; and, enabling the comparing responsive to sensing commutation.

16. A brushless, polyphase, direct-current motor having a rotor, stator coils, a commutation circuit for providing sequencing signals, and a circuit for clamping voltage spikes in the stator coils comprising:

a transistor having a current path connected between a voltage supply and the stator coil and having a control terminal;

a driver circuit connected to the control terminal of said transistor; and a comparator for comparing the voltage on the coil to a reference voltage and having an output connected to the control terminal of the transistor;

wherein said comparator turns on the transistor responsive to the voltage on the stator coil exceeding the voltage supply voltage.

17. The circuit of claim 16 wherein the comparator has a control terminal for receiving a disable signal, so that the comparator may be selectively disabled.

18. The circuit of claim 17 further comprising: means connected to the control terminal of the comparator for disabling the comparator until the commutation of a stator winding.

19. The circuit of claim 16 wherein the threshold voltage of said comparator is adjustable.

20. The circuit of claim 16 wherein the comparator comprises:

a first PNP transistor having an emitter as the inverted input of the comparator, having a base, and having a collector;

a second PNP transistor having an emitter as a non-inverted input of the comparator, having a base connected to the base and collector of the first PNP transistor, and having a collector;

a first current source having a drain connected to the collector and base of the first transistor and the base of the second transistor, and having a source connected to a voltage reference;

a second current source having a drain connected to the collector of the second transistor and forming the output node of the comparator, and having a source connected to the voltage reference.

* * * * *